Figure 1:
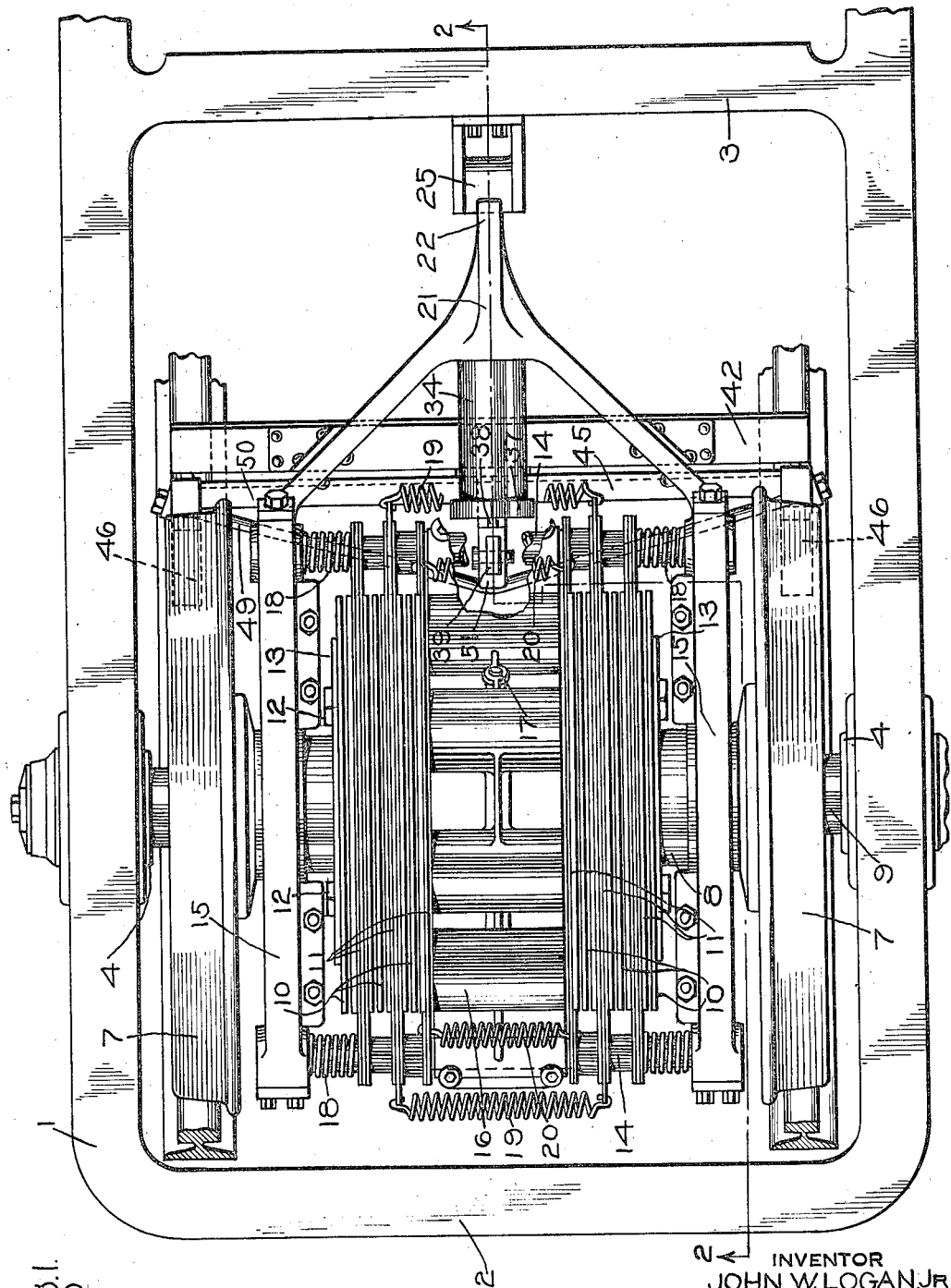

June 17, 1941.　　J. W. LOGAN, JR　　2,246,213
AXLE AND TREAD BRAKE
Filed June 29, 1939　　2 Sheets-Sheet 2
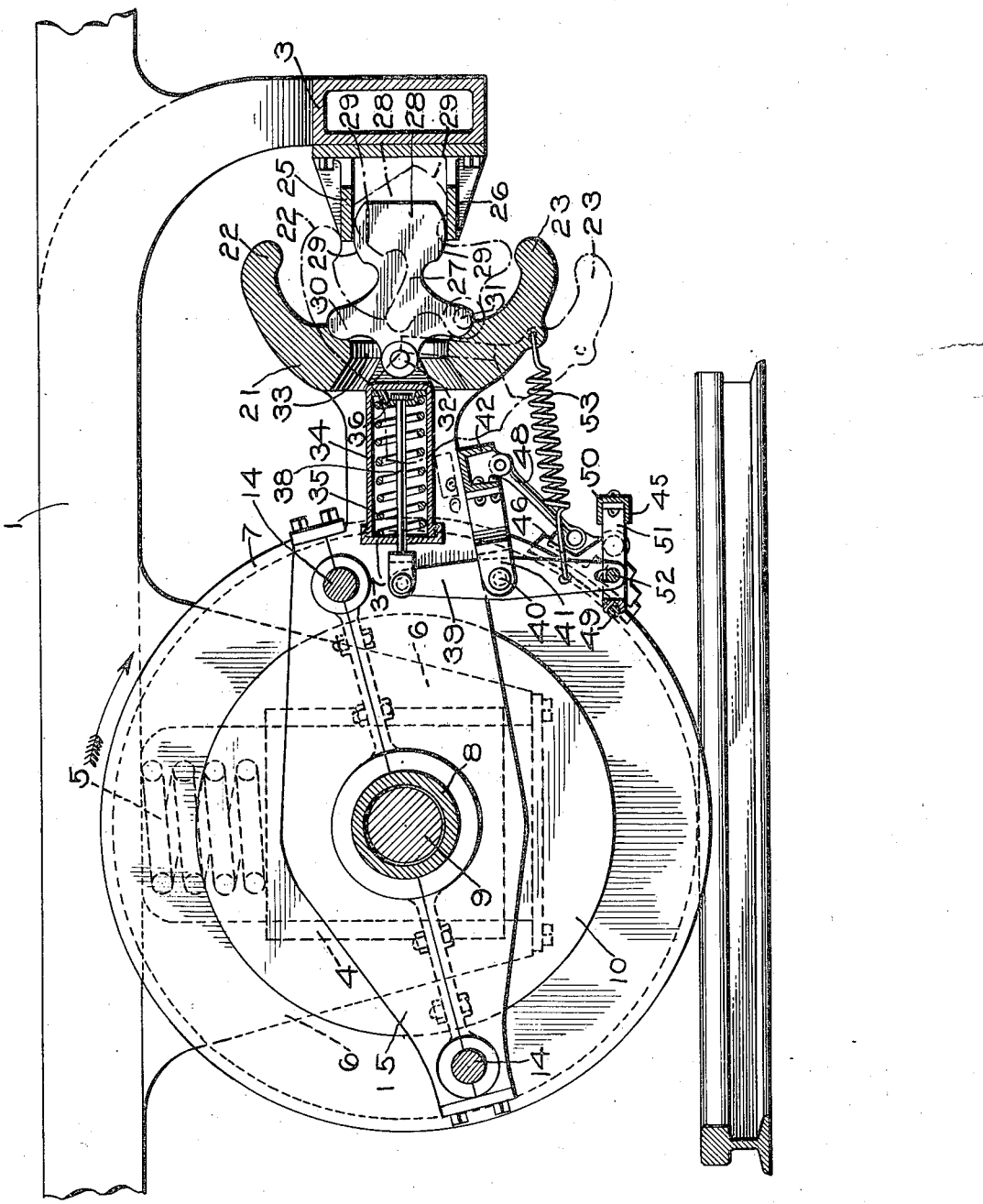

Patented June 17, 1941

2,246,213

UNITED STATES PATENT OFFICE 2,246,213

AXLE AND TREAD BRAKE

John W. Logan, Jr., Forest Hills, Pa., assignor to The Westinghouse Air Brake Company, Wilmerding, Pa., a corporation of Pennsylvania Application June 29, 1939, Serial No. 281,864

15 Claims. (Cl. 188—59)

This invention relates to railway vehicle brakes and more particularly to brakes of the non-tread type, such for instance as disk, drum, eddy current and traction motor brakes in which the braking of the wheels and axle assembly of vehicles is accomplished without any part of the braking apparatus contacting the treads of the wheels of such assembly.

In high speed train service it has been learned that the usual wheel tread brake rigging having brake shoes which bear against the face or rail contacting surfaces of the tread portions of the wheels in effecting an application of the brakes may, in some instances, be inadequate to provide the desired braking effect without undue wear and heating of the brake shoes and vehicle wheels. This is due particularly to the fact that the area of that portion of the face of each brake shoe which engages the face of the tread portion of a wheel is limited in width to the width of such face and in length by the ability of the shoe to withstand warpage and breakage, and by the proper relationship of its effective length to the diameter of the wheel.

For the purpose of overcoming the above difficulties it has been proposed to omit the usual tread brake and to provide in lieu thereof one or more of the above mentioned types of non-tread brake apparatus. In vehicles thus equipped it has been discovered that where there is nothing to at least occasionally contact the rail engaging surfaces of the tread portions of the wheels these surfaces will collect dirt. Dirt thus collected and adhering to the surfaces tends to reduce the adhesion between the wheels and track rails and as a consequence will impair the efficacy of a brake application, and may also act to cause the wheels to pound on the track rails and thereby produce objectionable noise and also damage to the wheels or rails or both.

The principal object of the invention is to provide a non-tread type of brake apparatus with novel means operative upon the initiation of an application of the brakes to free the rail engaging surface of the tread portion of a vehicle wheel of dirt which may have collected thereon.

Another object of the invention is to provide a non-tread type of brake mechanism with means responsive, when an application of the brakes is being effected, to the torque on the mechanism to frictionally engage the rail engaging surface of the tread of a wheel to free the surface of dirt which may have collected thereon and to in some measure assist in braking the vehicle.

Other objects and advantages will appear in the following more detailed description of the invention.

In the accompanying drawings, Fig. 1 is a plan view of a portion of a railway vehicle truck and non-tread type of brake apparatus embodying the invention; and Fig. 2 is a longitudinal vertical sectional view taken on the line 2—2 of Fig. 1.

While the invention is applicable to any non-tread type of brake apparatus, I have for illustrative purposes shown it in conjunction with only one of such types, namely, a disk brake apparatus, and for simplicity and clearness the following detailed description will be more or less limited to what is shown.

As shown in the drawings the invention is embodied in a railway vehicle truck which may comprise the usual cast metal truck frame comprising laterally spaced side frames 1 which are integrally connected together at each end by the usual end piece 2. On each side of the transverse center line of the truck the side frames are integrally connected together by a transversely extending transom 3. The truck frame is resiliently supported on wheel and axle assemblies through the medium of axle boxes 4 and springs 5 which are interposed between the frame and axle boxes. The axle box at the outside of each wheel of the wheel and axle assembly is slidably mounted in the usual manner between spaced pedestal jaws 6 depending downwardly from the adjacent side frame.

Each wheel and axle assembly may be identical with the assembly shown in the application of Joseph C. McCune, Serial No. 225,785, filed August 19, 1938, Patent No. 2,218,614, October 22, 1940, and may be briefly described as comprising spaced wheels 7 which are rigidly connected together by means of a hollow sleeve 8 which is secured at each end to the wheels, and further comprises an axle 9 which extends through the sleeve and which at its ends supports the axle boxes.

The disk brake mechanism is quite similar to the mechanism disclosed in the aforementioned McCune pending application, and for the purpose of the present application, has been shown more or less diagrammatically, and may be briefly described as comprising two laterally spaced sets of interleaved rotatable and non-rotatable friction braking disks 10 and 11, respectively, which encircle the sleeve and are disposed between the wheels of the wheel and axle assembly, the rotatable disks 10 being carried by laterally extending rods in the form of bolts 12 which are secured at each end to a collar 13 secured to the sleeve 8 for rotation therewith. The non-rotatable disks 11 are carried by laterally extending rods 14 which are rigidly carried by laterally spaced side pieces 15 of a yoke which straddles the braking disks. The rotatable disks are slidable on the bolts 12 and the non-rotatable disks are slidable on the rods 14. Interposed between the sets of braking disks is a brake cylinder device 16 which is operative by fluid under pressure admitted by way of passage 17 to move the disks of each set into frictional braking interengagement to oppose rotation of the wheel and axle assembly. Movement of these disks to their normal release position upon the release of fluid under pressure from the brake cylinder device by way of the passage 17 is effected by means of release springs 18, 19 and 20 in the same manner as fully described in the aforementioned McCune application.

The sides 15 of the yoke, intermediate their ends, are rockably mounted on the sleeve 8. At their inner ends these side pieces converge toward the longitudinal center line of the truck and merge into a jaw portion 21 having spaced upper and lower jaw members 22 and 23, respectively, which, as will hereinafter more fully appear, are adapted to engage the spaced upper and lower lugs 25 and 26 of a member rigidly secured to the adjacent transom 3 of the truck frame to prevent excessive rocking movement of the yoke relative to the frame.

Located between the jaw members 22 and 23 and extending outwardly beyond the ends thereof is a cruciform lever 27 having an arm 28 which extends between the lugs 25 and 26, said arm having upper and lower outwardly curved edge portions 29 which are adapted to contact with the inner surfaces of the lugs. These edge portions 29 are curved for the purpose of permitting free sliding movement between the arm and the lugs, when, as will hereinafter appear, the lever is moved upwardly or downwardly in a vertical direction relative to the lugs. The lever also has an upwardly extending arm 30 and a downwardly extending arm 31 which arms are disposed in vertical alignment with each other and at right angles to the arm 28. The ends of these arms 30 and 31 are rounded and slidably contact the jaw portion 21 within correspondingly shaped recesses formed on the interior of the portion, which recesses are located at the bases of the jaws 22 and 23.

The lever 27 also has a rearwardly extending arm 32 which extends through a central opening 33 provided in the jaw portion 21 of the yoke. This arm is pivotally connected at one end to one end of a spring casing 34 containing a spring 35 and a longitudinally movable follower 36, which follower forms a spring seat for one end of the spring. The other end of the spring seats on the inner surface of a cap 37 forming part of the casing.

Extending longitudinally through a central opening in the cap 37 of the spring casing is a rod 38 which is operatively connected at one end to the follower 36 and which at its other end is pivotally connected to the upper end of a vertically disposed lever 39 which is rockably carried on a pin 40 mounted in a bracket 41 rigidly secured to an inverted channel shaped member 42 extending transversely of the truck and rigidly secured, adjacent each of its ends to the converging portions of the side pieces 15 of the yoke.

Located below the horizontal center line of the wheel and axle assembly and extending transversely of the truck is a beam 45 which has mounted thereon adjacent each of its ends a shoe element 46 which is adapted to be moved into and out of engagement with the rail engaging surface of the tread portion of the adjacent wheel, the beam and thereby the shoe elements being operatively hung from the member 42 by means of hangers 48 which are pivotally connected to the member and shoe element as best shown in Fig. 2.

The beam 45 is of truss form and is quite similar in construction to the usual truck brake beam having spaced longitudinal members 49 and 50 which are maintained spaced apart intermediate their ends by a strut 51. The lower end of the lever 39 is operatively connected to this strut by means of a pin 52.

Interposed between the jaw member 23 and the lever 39 is a release spring 53 having one end anchored to the jaw member and the other end anchored to the lever at a point intermediate the pivot pins 40 and 52. The spring biases the lever counterclockwise and normally maintains the beam 35 and thereby the shoe element in normal release position as shown in Fig. 2 and at the same time tends to maintain the yoke and thereby the non-rotatable brake disks and brake cylinder against rocking on the sleeve 8 relative to the truck frame.

*Operations*

When it is desired to effect an application of the brakes, fluid under pressure is admitted through passasge 17 to the brake cylinder device 16 causing the device to operate to move the braking disks 10 and 11 of each set of disks into frictional braking interengagement. If, when the disks frictionally interengage the wheel and axle assembly and rotatable disks are rotating in a clockwise direction as indicated by the arrow in Fig. 2, the resulting torque causes the yoke and several parts carried thereby to tilt or rock in the same direction on the sleeve 8 and relative to the truck frame. As this movement starts, the lever arm 30 fulcrum on the jaw member 22 and rocks downwardly as shown in dot and dash lines in Fig. 2 causing the spring casing 34 to be moved outwardly, i. e., toward the right hand. It should here be mentioned that the spring 35 is of such a value that it will not compress under the opposing action of the spring 53. As the spring casing 34 and thereby spring 35 is thus moved, the lever 39, through the medium of the rod 38, is caused to rotate about the pin 40 against the opposing action of the spring 53, causing the beam 45 to act to move the shoe elements 46 to frictionally engage the track engaging surfaces of the tread portions of the wheels 7. The continued movement of the spring casing 34 after the shoe element is in engagement with the wheel will cause the spring 35 to be compressed. It will here be noted that the spring 35 will control or determine the force with which the shoe elements 46 are pressed into engagement with the wheel. In cases where the shoe element is intended to maintain the rail engaging surfaces of the tread portions of the wheel free of dirt, the spring 35 may be relatively light but where the shoe element is intended to also assist in braking the spring will be made heavier.

When it is desired to effect the release of the brakes, fluid under presure is vented through passage 17 from the brake cylinder device 16 so as to permit the release springs 18, 19 and 20 to act to move the braking disks 10 and 11 to their normal release position.

When the brake disks move out of engagement with each other the yoke will be entirely relieved of the torque of the wheel and axle assembly and as a consequence the spring 35 will act through the lever 27 and jaw member 22 to rock the yoke upwardly about the sleeve 8 to its centralized position in which the arm 31 of the lever is again engaged by the jaw member 23. In this position the spring 53 acts, through the medium of a lever 39 and beam 45, to move the shoe elements 46 out of engagement with the wheels 7 as shown in Fig. 2.

If, when the brake disks frictionally interengage the wheel and axle assembly are rotating in the direction opposite to that indicated by the arrow in Fig. 2, the resulting torque on the yoke causes the yoke and several parts carried thereby to tilt or rock in the same direction on the sleeve 8 and relative to the truck frame.

As this movement starts the lever arm 31 fulcrums on the jaw member 23 and rocks upwardly causing the shoe element 46 to be moved into frictional engagement with the track rail engaging surfaces of the tread portions of the wheels 7. Aside from the direction of movement of the lever 27 and the fulcruming of the arm 31 the action of the mechanism in both applying and releasing the brakes is the same as that described with the wheel and axle assembly rotating in the direction indicated by the arrow.

Modifications in the structure illustrated and described may be made without departing from the spirit and scope of my invention, and I do not therefore wish to be limited otherwise than by the scope of the appended claims.

Having now described my invention, what I claim as new and desire to secure by Letters Patent is:

1. The combination with a brake mechanism of the non-tread type for a wheel and axle assembly of a railway vehicle, an element movable into and out of contact with the rail engaging surface of the tread portion of a wheel of said assembly, and means responsive to the torque on said mechanism during braking for moving said element into contact with said surface, said means comprising an extensible actuating connection through the medium of which force is transmitted to said element, and means included in said connection for inhibiting the transmission of the full force of the mechanism to the element.

2. The combination with a brake mechanism of the non-tread type for a wheel and axle assembly of a railway vehicle, a friction element movable into and out of frictional engagement with the rail engaging surface of the tread portion of a wheel of said assembly, and means responsive to the torque on said mechanism during braking for moving said friction element into frictional engagement with said surface, said means comprising a two part extensible actuating connection through the medium of which force is transmitted to said friction element, and means included in said connection and interposed between the two parts thereof for limiting the force transmitted to the friction element.

3. The combination with a brake mechanism of the non-tread type for a wheel and axle assembly of a railway vehicle, a friction shoe movable into and out of frictional engagement with the rail engaging surface of the tread portion of a wheel of said assembly, and lever means responsive to the torque on said mechanism during braking for moving said shoe into frictional engagement with said surface, said lever means comprising a spring for absorbing a portion of the force transmitted thereto and thereby insuring the transmission of a lesser actuating force to said friction shoe.

4. The combination with a brake mechanism of the non-tread type for a wheel and axle assembly of a railway vehicle, an element movable into and out of contact with the rail engaging surface of the tread portion of a wheel of said assembly, means tiltable in response to the torque on said mechanism during braking and means responsive to the tilting movement of said means for actuating said element into contact with said surface, the last mentioned means comprising an extensible actuating connection through the medium of which force is transmitted to said element, and means included in said connection for absorbing a portion of the force transmitted to the connection by the mechanism.

5. The combination with a brake mechanism of the non-tread type for a wheel and axle assembly of a railway vehicle, and which is tiltable in response to the torque of the assembly, an element movable into and out of contact with the rail engaging surface of the tread portion of a wheel of said assembly, and means operative by the brake mechanism as it tilts in response to torque for moving said element into contact with said surface, and a spring included in said means for absorbing a portion of the force transmitted to the means and thereby preventing the full force of the mechanism from being transmitted to said element.

6. The combination with a brake mechanism of the non-tread type for a wheel and axle assembly of a railway vehicle, and which is tiltable in response to the torque of the assembly while an application of the brakes is being effected, a friction shoe movable into and out of frictional engagement with the rail engaging surface of the tread portion of a wheel of said assembly, and lever means operable when the mechanism is tilted for moving said shoe into frictional engagement with said surface, said lever means comprising a lever for actuating said friction shoe, a lever cooperating with said mechanism and a fixed part of the vehicle so as to operate, upon the tilting of the mechanism, to actuate the first mentioned lever, and spring means operatively connecting said levers, said spring means being so arranged with relation to both of said levers as to absorb a portion of the force transmitted by the second mentioned lever and thereby prevent the full force of the second mentioned lever from being transmitted to the first mentioned lever and friction shoe.

7. The combination with a brake mechanism of the non-tread type for a wheel and axle assembly of a railway vehicle, and which is tiltable in response to the torque of the assembly in braking, an element movable into and out of contact with the rail engaging surface of the tread portion of a wheel of said assembly, means for supporting said element from said mechanism and means operative by said mechanism as the mechanism is tilted for actuating said element into contact with said surface.

8. The combination with a brake mechanism of the non-tread type for a wheel and axle assembly of a railway vehicle, an element carried by said mechanism and movable relative thereto into and out of contact with the rail engaging surface of the tread portion of a wheel of said assembly, and means carried by said mechanism and cooperating with a relatively fixed part of the truck operative in response to the torque of said mechanism during braking for moving said element into contact with said surface.

9. The combination with a wheel and axle assembly of a railway vehicle, a non-tread type of brake mechanism for said assembly carried by the assembly and tiltable in response to torque of the assembly in braking, means carried by said mechanism and movable relative thereto into and out of contact with the track engaging surface of a wheel of the assembly, and means operative by said mechanism when the mechanism tilts for moving said element into contact with said surface.

10. The combination with a wheel and axle assembly of a railway vehicle, a non-tread type of brake mechanism for said assembly tiltable in response to torque of the assembly in braking, means movable into and out of contact with the track engaging surface of a wheel of the assembly, means operative by said mechanism when the mechanism tilts for moving said element into contact with said surface, and means included in said mechanism adapted to cooperate with the relatively fixed part of the vehicle when the mechanism tilts for limiting the tilting movement of the mechanism.

11. The combination with a brake mechanism of the non-tread type for a wheel and axle assembly of a railway vehicle truck, a member included in said mechanism and carried by said assembly and rockable thereon in response to torque of the assembly while braking, a friction element movable into frictional engagement with the rail engaging surface of a wheel of said assembly, means cooperating with said member and a relatively fixed part of said truck and operable by said member as the member rocks to move said element into frictional engagement with said surface, and means on said member adapted to cooperate with said fixed part of the truck to limit the rocking movement of the member.

12. The combination with a brake mechanism of the non-tread type for a wheel and axle assembly of a railway vehicle truck, a member included in said mechanism and carried by said assembly and rockable thereon in response to torque of the assembly while braking, a friction element carried by said member and movable relative thereto into and out of frictional engagement with the rail engaging surface of a wheel of said assembly, means carried by said member operative to move said element into frictional engagement with said surface, a lever cooperating with said member and a relatively fixed part of the truck operative by the member when said member rocks for actuating said means, and a resilient operating connection between said lever and means for limiting the force with which the element is pressed into frictional engagement with said surface.

13. The combination with a brake mechanism of the non-tread type for a wheel and axle assembly of a railway vehicle truck, a member included in said mechanism carried by said assembly and rockable thereon in response to torque of the assembly while braking, a friction element carried by said member and movable relative thereto into and out of frictional engagement with the rail engaging surface of a wheel of said assembly, means carried by said member operative to move said element into frictional engagement with said surface, a lever cooperating with said member and a relatively fixed part of the truck operative by the member when the member rocks for actuating said means, and means included in the operating connection between said lever and member for limiting the force with which said element is pressed into engagement with said surface.

14. In a brake mechanism for a wheel and axle assembly of a railway vehicle truck, in combination, a friction braking disk rotatable with said assembly, a friction braking disk for frictional braking engagement with the rotatable disk, a member rockably mounted on said assembly and carrying the second mentioned disk, said member being adapted to cooperate with a relatively fixed part of the truck to maintain the member and thereby the second mentioned disk against complete rotation with the assembly, means operative to effect the frictional braking interengagement of said disks, said member being rockable in response to the torque on the second mentioned disk, an element adapted to be moved into frictional engagement with the rail engaging surface of a wheel of said assembly, and means actuated by said member when it is rocked for moving said element into frictional engagement with said surface, said means comprising a member cooperating with said fixed part of the truck and said member to rock in response to the rocking movement of said member, and means actuated by said member for actuating said element.

15. In a brake mechanism for a wheel and axle assembly of a railway vehicle truck, in combination, a friction braking disk rotatable with said assembly, a friction braking disk for frictional braking engagement with the rotatable disk, means rockably mounted on said assembly and carrying the second mentioned disk, said means being adapted to cooperate with a relatively fixed part of the truck to maintain the means and thereby the second mentioned disk against complete rotation with the assembly, mechanism included in said means operative to effect the frictional braking interengagement of said disks, said member being rockable in response to the torque on the second mentioned disk, an element carried by said means adapted to be moved into frictional engagement with the rail engaging surface of a wheel of said assembly, and a mechanism carried by said means and cooperating with said relatively fixed part of the truck and operative by said means when the means is rocked for moving said element into frictional engagement with the surface.

JOHN W. LOGAN, Jr.